US009754237B2

United States Patent
Bhat et al.

(10) Patent No.: US 9,754,237 B2
(45) Date of Patent: Sep. 5, 2017

(54) INDEX IMAGE QUALITY METRIC

(71) Applicants: Srikrishna Bhat, Karnataka (IN); Sri Kaushik Pavani, Chennai (IN); Anshul Garg, Haryana (IN)

(72) Inventors: Srikrishna Bhat, Karnataka (IN); Sri Kaushik Pavani, Chennai (IN); Anshul Garg, Haryana (IN)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 14/975,655

(22) Filed: Dec. 18, 2015

(65) Prior Publication Data
US 2017/0178058 A1 Jun. 22, 2017

(51) Int. Cl.
*G06K 9/00* (2006.01)
*G06Q 10/08* (2012.01)
*G06T 7/20* (2017.01)

(52) U.S. Cl.
CPC ............ *G06Q 10/087* (2013.01); *G06T 7/20* (2013.01); *G06T 2207/30168* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,763,148 | B1 * | 7/2004 | Sternberg | G06F 17/30247 382/293 |
| 6,937,654 | B2 * | 8/2005 | Mori | H04N 19/176 375/240.08 |
| 6,944,331 | B2 * | 9/2005 | Schmidt | G06T 7/001 382/165 |
| 7,769,219 | B2 * | 8/2010 | Zahniser | G02B 21/244 348/356 |
| 7,953,299 | B2 | 5/2011 | Shiiyama | |
| 8,396,269 | B2 * | 3/2013 | Henderson | G06K 9/00134 382/128 |

(Continued)

FOREIGN PATENT DOCUMENTS

WO    WO2015086537    6/2015

OTHER PUBLICATIONS

Kwatra, Vivek et al.; "Graphcut Textures: Image and Video Synthesis Using Graph Cuts"; found at http://www.cc.gatech.edu/cpl/projects/graphcuttextures; dated 2003; 10 pages; GVU Center / College of Computing Georgia Institute of Technology.

(Continued)

*Primary Examiner* — Anand Bhatnagar
(74) *Attorney, Agent, or Firm* — Patent Law Works LLP

(57) ABSTRACT

A system and method that computes a quality score for an index image is disclosed. The method includes receiving an index image, computing a blurriness score of the index image based on variance associated with the index image, computing an image resolution score of the index image based on an area of the index image and a threshold area, computing a feature spread score for the index image using a first plurality of features associated with the index image, computing a feature uniqueness score for the index image using a description associated with each of a second plurality of features and determining a quality score for the index image using the blurriness score, the image resolution score, the feature spread score, and the feature uniqueness score.

21 Claims, 9 Drawing Sheets

(56) References Cited

U.S. PATENT DOCUMENTS

| | | | |
|---|---|---|---|
| 8,503,822 B2* | 8/2013 | Yamada | G06T 7/0002 382/278 |
| 8,861,884 B1* | 10/2014 | Fang | G06T 5/003 382/255 |
| 2003/0083850 A1 | 5/2003 | Schmidt et al. | |
| 2006/0013463 A1 | 1/2006 | Ramsay et al. | |
| 2008/0089615 A1 | 4/2008 | Shiiyama | |
| 2010/0322509 A1* | 12/2010 | Shimizu | G06T 5/002 382/162 |
| 2011/0013830 A1* | 1/2011 | Yamada | G06T 7/0002 382/165 |
| 2012/0243737 A1 | 9/2012 | Ogawa | |
| 2015/0030239 A1* | 1/2015 | Fang | G06T 5/003 382/159 |
| 2015/0287239 A1* | 10/2015 | Berghoff | G06F 9/48 345/422 |
| 2016/0048952 A1* | 2/2016 | Tezaur | G06T 5/004 382/255 |
| 2016/0247034 A1* | 8/2016 | Lee | G06K 9/036 |

OTHER PUBLICATIONS

F. Pitie, et al.; "N-Dimensional Probability Density Function Transfer and its Application to Colour Transfer"; dated 2005; 6 pages; University of Dublin, trinity College Dublin 2, Ireland.

Matthew Brown and David G. Lowe "Automatic Panoramic Image Stitching Using Invariant Features"; dated Dec. 2006; 15 pages; International Journal of Computer Vision 74(1).

Francois Pitie, et al.; "Automated Colour Grading Using Colour Distribution Transfer"; dated 2007; 15 pages; Trinity College Dublin, 2 College Green, Dublin, Ireland.

F. Pitie, A. Kokaram "The Linear Monge-Kantorovitch Linear Colour Mapping for Example-Based Colour Transfer"; dated 2007; 9 pages; sigmedia.tv, Trinity College Dublin, Ireland.

Jorge Moraleda and Jonathan J. Hull; "Toward Massive Scalability in Image Matching"; dated 2010; 4 pages; 2010 International Conference on Pattern Recognition.

Mazin, Baptiste, et al. "Combining Color and Geometry for Local Image Matching" dated Nov. 11-15, 2012; 4 pages; 21st International Conference on Pattern Recognition (ICPR 2012), Tsukuba, Japan.

Nicolas Bonneel, et al. "Example-Based Video Color Grading" dated 2013; 11 pages.

Gormish, Michael; "Stitching Software for Ocutag Retail Execution (ORE)", dated Oct. 12, 2015; 15 pages.

Ramya Narasimha, et al. "Colour-Based Post-Processing of RVS Image Matching Results for ORE Product Disambiguation" dated Oct. 21, 2015, 18 pages.

* cited by examiner

| | Category - All ▼ | Subject - All ▼ | | | | Search | 🔍 |
|---|---|---|---|---|---|---|---|
| | UPC | Name | Images | Versions | Quality | Expired | |
| ☐ | | | | | | | |
| ☐ | 0037000002654 | Mouthwash green | 1 | 1 | ◐ | ⊖ | |
| ☐ | 0037000002744 | Mouthwash purple | 12 | 2 | ○ | | |
| ☐ | 0037000002954 | Mouthwash orange | 11 | 1 | ○ | | |
| ☐ | 0037000003102 | Mouthwash blue | 0 | 0 | ● | | |
| ☐ | 0037000003203 | Mouthwash indigo | 7 | 2 | ○ | | |
| ☐ | 0037000003331 | Mouthwash flash fresh | 32 | 5 | ○ | | |
| ☐ | 0037000003412 | Mouthwash explosion | 1 | 1 | ○ | | |
| ☐ | 0037000003515 | Mouthwash silver | 13 | 2 | ◐ | ⊖ | |

(Add Product) 316

(Delete Selected) 318

Figure 3

INDEX IMAGE QUALITY METRIC

BACKGROUND

Field of the Invention

The specification generally relates to computing a quality score for an index image to indicate recognizability of the index image. In particular, the specification relates to a system and method for determining a quality score for an index image that is calculated using a blurriness score, an image resolution score, a feature spread score, and a feature uniqueness score associated with the index image.

Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity and sizes of an item are placed to optimize profits or other parameters. However, presentation and maintenance of adequate levels of stock on shelves, racks, and display stands is a labor-intensive effort, thereby making enforcement of planograms difficult. While the location and quantity of products in retail stores can be manually tracked by a user, attempts are being made to automatically recognize the products using computers. However, indexed images used for recognizing products on the shelf are more effective when they are of a particular quality. Therefore, there is a need for a method to provide an estimate of how likely and quickly a product will be recognized accurately based on a provided index image.

SUMMARY

The techniques introduced herein overcome the deficiencies and limitations of the prior art, at least in part, with a system and method for computing a quality score for an index image. In one embodiment, the system includes an image recognition application. The image recognition application is configured to receive an index image. The image recognition application is further configured to compute a blurriness score for the index image based on a variance associated with the index image. The image recognition application is further configured to compute an image resolution score for the index image based on an area of the index image and a threshold area. The image recognition application is further configured to compute a feature spread score for the index image using a first plurality of features associated with the index image. The image recognition application is further configured to compute a feature uniqueness score for the index image using a description associated with each of a second plurality of features. The image recognition application is further configured to determine a quality score for the index image using the blurriness score, the image resolution score, the feature spread score, and the feature uniqueness score.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIGS. 3-5 are graphical representations illustrating embodiments of displaying a quality score for an index image.

DETAILED DESCRIPTION

Figure 1:
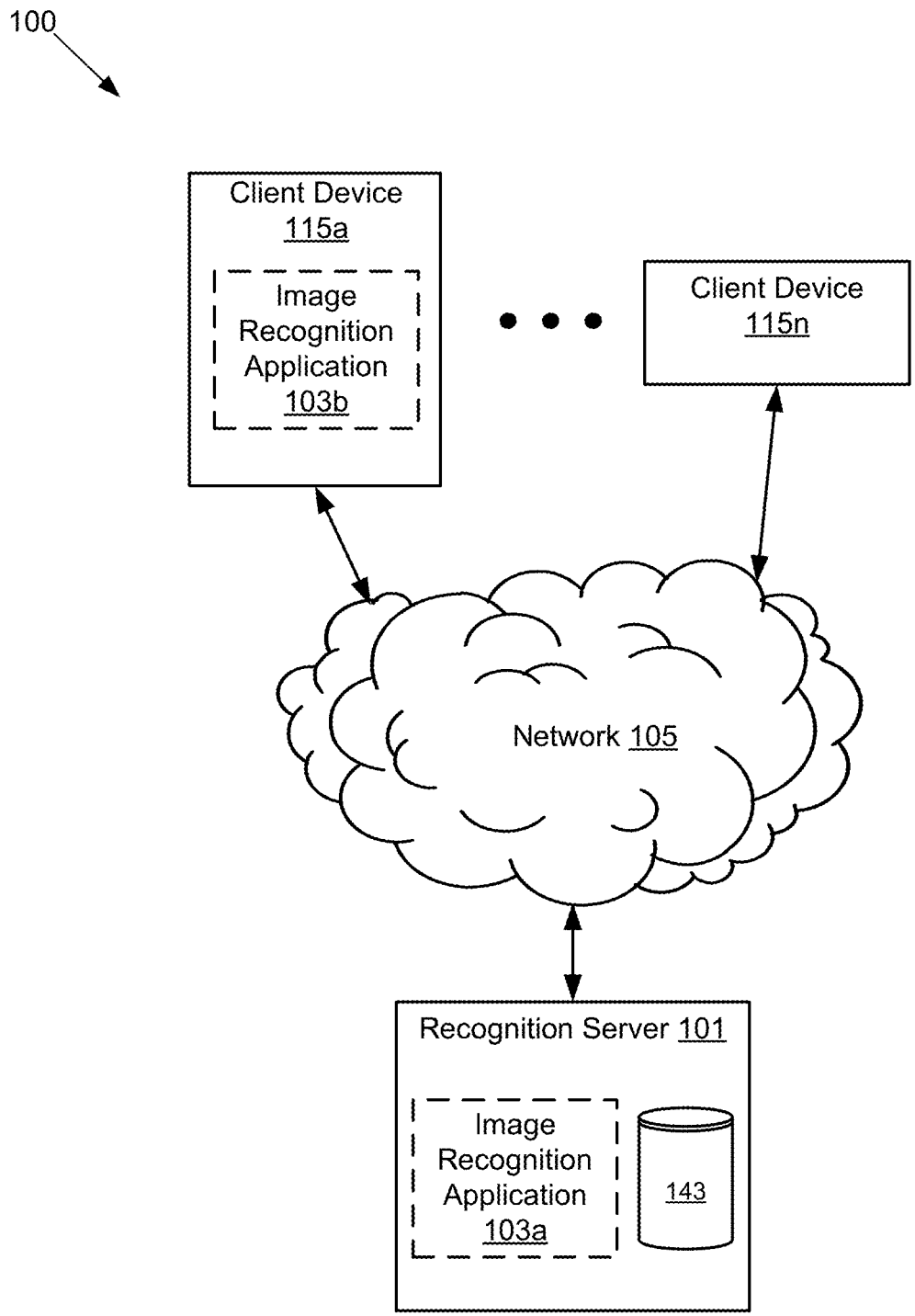
FIG. 1 is a high-level block diagram illustrating one embodiment of a system 100 for computing a quality score for an index image.

FIG. 1 is a high-level block diagram illustrating one embodiment of a system 100 for computing a quality score for an index image. The illustrated system 100 may have one or more client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. In some embodiments, the recognition server 101 may be either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement an image recognition application 103*a* described in more detail below. In one embodiment, the recognition server 101 determines a measure of recognizability of an index image provided by a user. As used herein, recognizability of an index image is an estimate of how likely and/or quickly an object (e.g., an object that corresponds to the index image) depicted in a query image will be identified using the index image. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images to and from the client device 115. The images may include a query image of a product on a shelf of a retail display or an index image used in identifying products on a shelf in a query image. In some embodiments, the recognition server may request images of a different face of the same product. The images received by the recognition server 101 can include an image captured by the client device 115, an image copied from a website or an email, or an image from any other source. In another example, the recognition server 101 sends request for datasets and receives datasets from a plurality of third-party servers (not shown). Although only a single recognition server 101 is shown in FIG. 1, it should be understood that there may be any number of recognition servers 101 or a server cluster. The recognition server 101 also includes a data storage 143.

The client device 115 may be a computing device that includes a memory, a processor, and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for applications. For example, the client device 115 may include a graphics processor unit (GPU) for handling graphics and multimedia processing. The client device 115 includes a display for viewing information provided by the recognition server 101. While FIG. 1 illustrates two client devices 115*a* and 115*n*, the disclosure applies to a system architecture having one or more client devices 115.

The client device 115 is adapted to send and receive data to and from the recognition server 101. For example, the client device 115 may send an index image to the recognition server 101 and the recognition server 101 provides data in JavaScript Object Notation (JSON) format including a quality score for the index image to the client device 115. Similarly, the client device 115 may send a query image of products on a retail shelf to the recognition server 101 and the recognition server 101 may provide data in JavaScript Object Notation (JSON) format including information about a product matching the index image. The client device 115 may support use of graphical application program interface (API) such as Metal on Apple iOS™ or RenderScript on Android™ for determination of feature location and feature descriptors during image processing of the index or query images.

The image recognition application 103 may include software and/or logic to provide the functionality for computing a quality score for an index image, among other things. In some embodiments, the image recognition application 103*b* may be a thin-client application with some functionality executed on the client device 115 and additional functionality executed on the recognition server 101 by image recognition application 103*a*. For example, the image recognition application 103*b* on the client device 115 could include software and/or logic for capturing an index image, transmitting the index image to the recognition server 101, and displaying the quality score associated with the index image. In another example, the image recognition application 103*a* on the recognition server 101 could include software and/or logic for generating a blurriness score, an image resolution score, a feature spread score, and a feature uniqueness score for the index image. The image recognition application 103*a* or 103*b* may include further functionality described herein, such as, processing a query image and performing feature identification between the query image and indexed images.

In some embodiments, the image recognition application 103 receives an image of a product to be indexed for image recognition operations. The image recognition application 103 determines features of the index image. The image recognition application 103 computes a blurriness score for the index image based on a variance associated with the index image. The image recognition application 103 determines an area of the index image and computes an image resolution score for the index image based on the calculated area of the index image and a threshold area. The image recognition application 103 computes a feature spread score for the index image using determined features of the index image. The image recognition application 103 computes a feature uniqueness score for the index image using a description associated with determined features of the index image. The image recognition application 103 determines a quality score for the index image based, at least in part, on one or more of the blurriness score, the image resolution score, the feature spread score, and the feature uniqueness score. The operation of the image recognition application 103 and the functions listed above are described in more detail below with reference to FIGS. 3-9.

Figure 2:
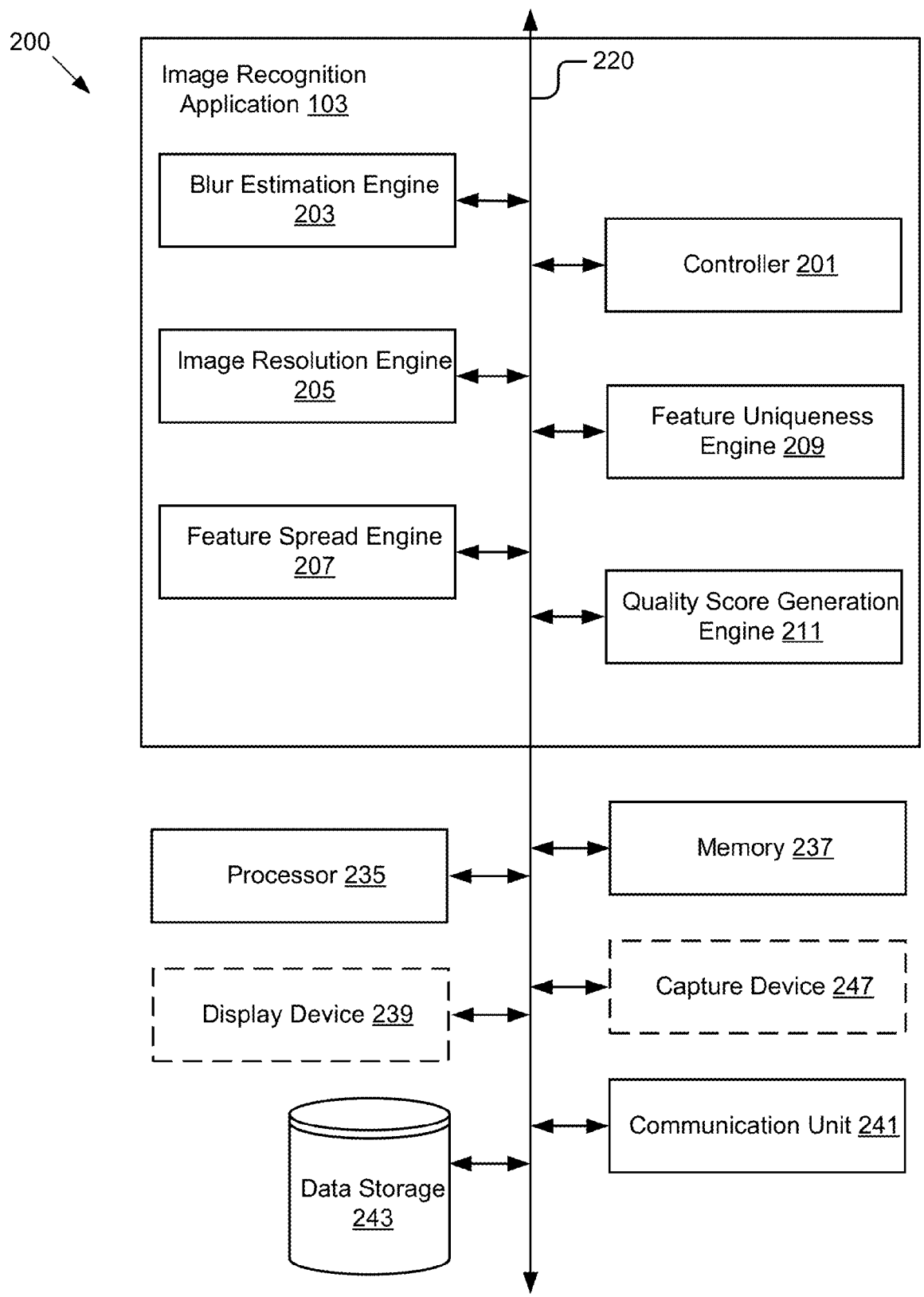
FIG. 2 is a block diagram illustrating one embodiment of a computing device 200 including an image recognition application.

FIG. 2 is a block diagram illustrating one embodiment of a computing device 200 including an image recognition application 103. The computing device 200 may also include a processor 235, a memory 237, an optional display device 239, a communication unit 241, data storage 243, and an optional capture device 247 according to some embodiments. The components of the computing device 200 are communicatively coupled by a bus or software communication mechanism 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the client device 115, the recognition server 101, or a combination of the client device 115 and the recognition server 101. In such embodiments where the computing device 200 is the client device 115 or the recognition server 101, it should be understood that the client device 115 and the recognition server 101 may include other components not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the optional display device 239, the communication unit 241, the image recognition application 103, the data storage 243, and the optional capture device 247. It will be apparent that other processors, operating systems, sensors, displays and physical configurations are possible.

The memory 237 may store and provide access to data for the other components of the computing device 200. The memory 237 may be included in a single computing device or distributed among a plurality of computing devices. In some implementations, the memory 237 may store instructions and/or data that may be executed by the processor 35. The instructions and/or data may include code for performing the techniques described herein. For example, in one embodiment, the memory 237 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) devices, a dynamic random access memory (DRAM) device, a static random access memory (SRAM) device, an embedded memory device, a discrete memory device (e.g., a PROM, FPROM, ROM), a hard disk drive, an optical disk drive (CD, DVD Blu-Ray™, etc.) mediums, which can be any tangible apparatus or device that can contain, store, communicate, or transport instructions, data, computer programs, software, code, routines, etc., for processing by or in connection with the processor 235. In sonic implementations, the memory 237 may include one or more of volatile memory and non-volatile memory. It should be understood that the memory 237 may be a single device or may include multiple types of devices and configurations.

The display device 239 may be a liquid crystal display (LCD), light emitting diode (LED) or any other similarly equipped display device, screen or monitor. The display device 239 represents any device equipped to display user interfaces, electronic images, and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2 with dashed lines to indicate it is optional. For example, where the computing device 200 is the recognition server 101, the display device 239 is not part of the system, and where the computing device 200 is the client device 115, the display device 239 is included and is used to display index images and quality score associated with the index images.

The communication unit 241 is hardware and/or software for receiving and transmitting data by linking the processor 235 to the network 105 and other processing systems. The communication unit 241 receives data such as requests from the client device 115 and transmits the requests to the controller 201, for example a request to process a query image. The communication unit 241 also transmits information including recognition results to the client device 115 for display, for example, in response to processing the query image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 may store data for analyzing a received index image and results of the analysis and other functionality as described herein. For example, the data storage 243 may store templates for a plurality of stock keeping units for image recognition purposes. A stock keeping unit (SKU) is a distinct item, such as a product offered for sale. The stock keeping unit includes all attributes that makes the item distinguishable as a distinct product from all other items. For example, the attributes include product identifier (Universal Product Code), product name, dimensions (width, height, depth, etc.), size (liters, gallons, ounces, pounds, kilograms, fluid ounces, etc.), description, brand manufacturer, color, packaging, material, model number, price, discount, base image, etc. The stock keeping unit may also refer to a descriptor or a unique identifier that refers to the particular product or service in the inventory. The template may include an index image used for feature point matching to identify objects in a query image. The data storage 243 may similarly store a score determined for the index image. Additionally, the data storage 243 may store datasets used in evaluating the score for the index image. In some embodiments, the data storage 243 stores a query image and the set of features determined for the query image. The data stored in the data storage 243 is described below in more detail.

The capture device 247 may be operable to capture an image or data digitally of an object of interest. For example, the capture device 247 may be a high definition (HD) camera, a regular 2D camera, a multi-spectral camera, a structured light 3D camera, a time-of-flight 3D camera, a stereo camera, a standard smartphone camera or a wearable computing device. The capture device 247 is coupled to the bus to provide the images and other processed metadata to the processor 235, the memory 237 or the data storage 243. It should be noted that the capture device 247 is shown in FIG. 2 with dashed lines to indicate it is optional. For example, where the computing device 200 is the recognition server 101, the capture device 247 is not part of the system, and where the computing device 200 is the client device 115, the capture device 247 is included and is used to provide images and other metadata information described below with reference to FIGS. 3-9.

In some embodiments, the image recognition application 103 may include a controller 201, a blur estimation engine 203, an image resolution engine 205, a feature spread engine 207, a feature uniqueness engine 209 and a quality score generation engine 211. The components of the image recognition application 103 are communicatively coupled via the bus 220. The components of the image recognition application 103 can be implemented using programmable or specialized hardware including a field-programmable gate array (FPGA) or an application-specific integrated circuit (ASIC). In some embodiments, the components of the image recognition application 103 can be implemented using a combination of hardware and software executable by processor 235. In some embodiments, the components of the image recognition application 103 are a set of instructions executable by the processor 235. In some implementations, the components of the image recognition application 103 are stored in the memory 237 and are accessible and executable by the processor 235. In some implementations, the components of the image recognition application 103 are adapted for cooperation and communication with the processor 235, the memory 237 and other components of the image recognition application 103 via the bus or software communication mechanism 220.

The controller 201 may include software and/or logic to control the operation of the other components of the image recognition application 103. The controller 201 controls the other components of the image recognition application 103 to perform the methods described below with reference to FIGS. 6-9. The controller 201 may also include software and/or logic to provide the functionality for handling communications between the image recognition application 103 and other components of the computing device 200 as well as between the components of the image recognition appli-cation 103.

In some embodiments, the controller 201 sends and receives data, via the communication unit 241, to and from one or more of the client device 115 and the recognition server 101. For example, the controller 201 receives, via the communication unit 241, an index image from a client device 115 operated by a user and sends the index image to the blur estimation engine 203. In another example, the controller 201 receives data for providing a graphical user interface to a user from the quality score generation engine 211 and sends the data to a client device 115, causing the client device 115 to present the user interface to the user.

In some embodiments, the controller 201 receives data from other components of the image recognition application 103 and stores the data in the data storage 243. For example, the controller 201 receives data including features identified for an index image from the feature uniqueness engine 209 and stores the data in the data storage 243. In other embodiments, the controller 201 retrieves data from the data storage 243 and sends the data to other components of the image recognition application 103. For example, the controller 201 retrieves data including a threshold area for an index image from the data storage 243 and sends the retrieved data to the image resolution engine 205.

In some embodiments, the communications between the image recognition application 103 and other components of the computing device 200 as well as between the components of the image recognition application 103 can occur independent of the controller 201.

The blur estimation engine 203 may include software and/or logic for processing an index image from the client device 115 and estimating an amount of blur in the index image. For example, the blur estimation engine 203 receives an index image. The index image may be received by the recognition server 101 to be included in an index of images used for identifying objects in a query image. In some embodiments, the blur estimation engine 203 calculates an amount of blur in the index image and classifies the index image as blurry or non-blurry. To classify the image as blurry or non-blurry, in one embodiment, the blur estimation engine 203 computes a Fast Fourier Transform on the index image examines the distribution of low and high frequencies. For example, the blur estimation engine 203 may determine that the index image as blurry if the total number of high frequencies satisfies a threshold.

In some embodiments, the blur estimation engine 203 may determine a blurriness score (e.g., a single floating point value) to represent blurriness of the index image. For example, the blur estimation engine 203 may convolve the index image with a Laplacian kernel and determine a variance for the convolved image. A Laplacian kernel is used to measure a second derivative of the index image and highlights regions of the index image containing rapid intensity changes. The Laplacian kernel is often used for edge detection. The blur estimation engine 203 determines that if the index image contains high variance then there is a wide spread of edge-like and non-edge like responses, and the index image is representative of a non-blurry image. On the other hand, if the variance value is low, indicating that there are few edges in the image, the index image is representative of a blurry image. In some embodiments, the variance calculated by this method is used as the blurriness score.

In some embodiments, the blur estimation engine 203 determines whether the index image is too blurry for reliable recognition. For example, by comparing the blurriness score with a threshold and, if the blurriness score satisfies the threshold, the blur estimation engine 203 identifies the index image as too blurry for reliable recognition. In some embodiments, if the index image is too blurry, the image recognition application 103 generates graphical data including instructions for the user to retake the image.

In some embodiments, if the blur estimation engine 203 determines that the index image is blurry, the image recognition application 103 may not perform any further quality checks and generates graphical data for displaying to the user that the image quality as unacceptable. In some embodiments, the blur estimation engine 203 sends data including the blurriness score or a blurriness determination to the image quality score generation engine 211. In other embodiments, the blur estimation engine 203 stores the blurriness score or the blurriness determination in the data storage 243.

The image resolution engine 205 may include software and/or logic to generate an image resolution score for an index image. In some embodiments, the image resolution engine 205 receives an index image and determines an area of the index image. For example, the image resolution engine 205 may calculate the area of the index image as a product of the width, in pixels, of the index image and the height, in pixels, of the index image. In some embodiments, the image resolution engine 205 computes an image resolution score for the index image based on the area of the index image. In an example embodiment, the image resolution module 205 calculates an image resolution using the following equation:

image resolution score=minimum(1.0,area/desired area)

The desired area may be a defined threshold area. For example, if the desired area is 400*400=160000 px$^2$ and the area of the index image is greater than 160000 px$^2$, then the image resolution score is 1. In this example, the maximum image resolution score for the index image is 1.

In some embodiments, the image resolution engine 205 does not limit the image resolution score to 1 and an image with a higher resolution receives a higher score. In some embodiments, if the image resolution engine 205 determines that the image resolution score for the index image is less than a threshold (e.g., not 1), the image recognition application 103 may not perform any further quality checks and generates graphical data for displaying to the user that the image quality as unacceptable. In some embodiments, if the image resolution engine 205 determines that the image quality is unacceptable, the image recognition application 103 generates graphical data including instructions for the user to retake the image.

In some embodiments, the image resolution engine 205 sends data including the image resolution score to the quality score generation engine 211. In other embodiments, the image resolution engine 205 stores the image resolution score in the data storage 243.

The feature spread engine 207 may include software and/or logic to calculate a feature spread score for an index image. In some embodiments, the feature spread engine 207 identifies features in the index image. The feature spread engine 207 determines the uniformity with which features are spread across the index image. In some embodiments, the feature spread engine 207 splits the index image based on a grid.

In some embodiments, the feature spread engine 207 counts the number of features in cells formed by the grid. In some embodiments, the feature spread engine 207 determines that the number of features in the cells of the grid are distributed evenly across the cells. The feature spread engine 207 may generate a feature spread score based on the distribution. For example, more evenly distributed features would receive a higher score. In other embodiments, the feature spread engine 207 determines whether the number of features in each cell of the grid satisfies a threshold. In some embodiments, the feature spread engine 207 assigns a higher feature spread score to an image if the number of features in each cell of the grid is more than the threshold. In some embodiments, the feature spread engine 207 assigns a lower feature spread score to an image if the number of features in some cells of the grid is less than the threshold. In some embodiments, if the feature spread engine 207 determines that the feature spread score for the index image is less than a threshold, the image recognition application may not perform any further quality checks and generates graphical data displaying to the user that the image quality as unacceptable. In some embodiments, if the feature spread engine 207 determines that the image quality is unacceptable, the image recognition application 103 generates graphical data including instructions for the user to retake the image.

In some embodiments, the feature spread engine 207 sends data including the feature spread score to the quality score generation engine 211. In other embodiments, the feature spread engine 207 stores the feature spread score in the data storage 243.

The feature uniqueness engine 209 may include software and/or logic to calculate a feature uniqueness score for an index image. The feature uniqueness engine 209 determines a set of features for the index image. For example, the feature uniqueness engine 209 may determine a location, an orientation, and an image descriptor for each feature identified in the index image. In some embodiments, the feature uniqueness engine 209 determines a feature uniqueness score based on a descriptor associated with each feature in the index image. In some embodiments, the feature uniqueness engine 209 computes the feature uniqueness score for a subset of the total number of features included in the index image.

In some embodiments, the feature uniqueness engine 209 uses corner detection algorithms for determining feature location. For example, the corner detection algorithms can include Shi-Tomasi corner detection algorithm, Harris and Stephens corner detection algorithm, etc. In some embodiments, the feature uniqueness engine 209 uses feature description algorithms for determining efficient image feature descriptors. For example, the features description algorithms may include Binary Robust Independent Elementary Features (BRIEF), etc. An image descriptor of a feature may be a 256-bit bitmask which describes the image sub-region covered by the feature. In some embodiments, the feature uniqueness engine 209 may compare each pair of 256 pixel pairs near the feature for intensity and based on each comparison, the feature uniqueness engine 209 may set or clear one bit in the 256-bit bitmask.

In some embodiments, the feature uniqueness engine 209 compares the image feature descriptors to determine if the image feature descriptors are unique. The feature uniqueness engine 209 generates clusters based on the image feature descriptors. For example, features having similar descriptors are grouped into one cluster. In some embodiments, the feature uniqueness engine 209 assigns a high feature uniqueness score if the number of clusters satisfies a threshold. For example, an image having a low number of unique features (e.g., a checkerboard) receives a low feature uniqueness score since it is more difficult to determine a match. In some embodiments, if the feature uniqueness score is less than a threshold, the image recognition application 103 may not perform any further quality checks and generates graphical data displaying to the user that the image quality as unacceptable. In some embodiments, if the feature uniqueness module determines that the image quality is unacceptable, the image recognition application 103 generates graphical data including instructions for the user to retake the image. In some embodiments, the feature uniqueness engine 209 sends data including the feature uniqueness score to the quality score generation engine 211.

The quality score generation engine 211 may include software and/or logic for generating a quality score for an index image. In some embodiments, the quality score generation engine 211 receives a blurriness score from the blur estimation engine 203, an image resolution score from the image resolution engine 205, a feature spread score from the feature spread engine 207, and a feature uniqueness score from the feature uniqueness engine 209. The quality score generation engine 211 calculates an overall quality score for the index image using the blurriness score, the image resolution score, the feature spread score, and the feature uniqueness score. In some embodiments, the quality score generation engine 211 may assign different weights to the scores. For example, the quality score generation engine 211 may assign a higher weight to a score that is more influential on the speed and/or accuracy with which a match to the index image can be made. In some embodiments, the image recognition application 103 generates a graphical user interface that displays the quality score of an index image on the display of the client device 115.

In some embodiments, the graphical user interface may include a colored circle indicating image recognizability, for display on the client device 115. For example, a green circle may indicate that an index image has high quality, a yellow circle may indicate that the image has intermediate quality, and a red circle may indicate that the image has poor quality. In some embodiments, the image recognition application 103 may generate graphical data including instructions for the user to replace a poor quality image based on the quality score.

Figure 4:
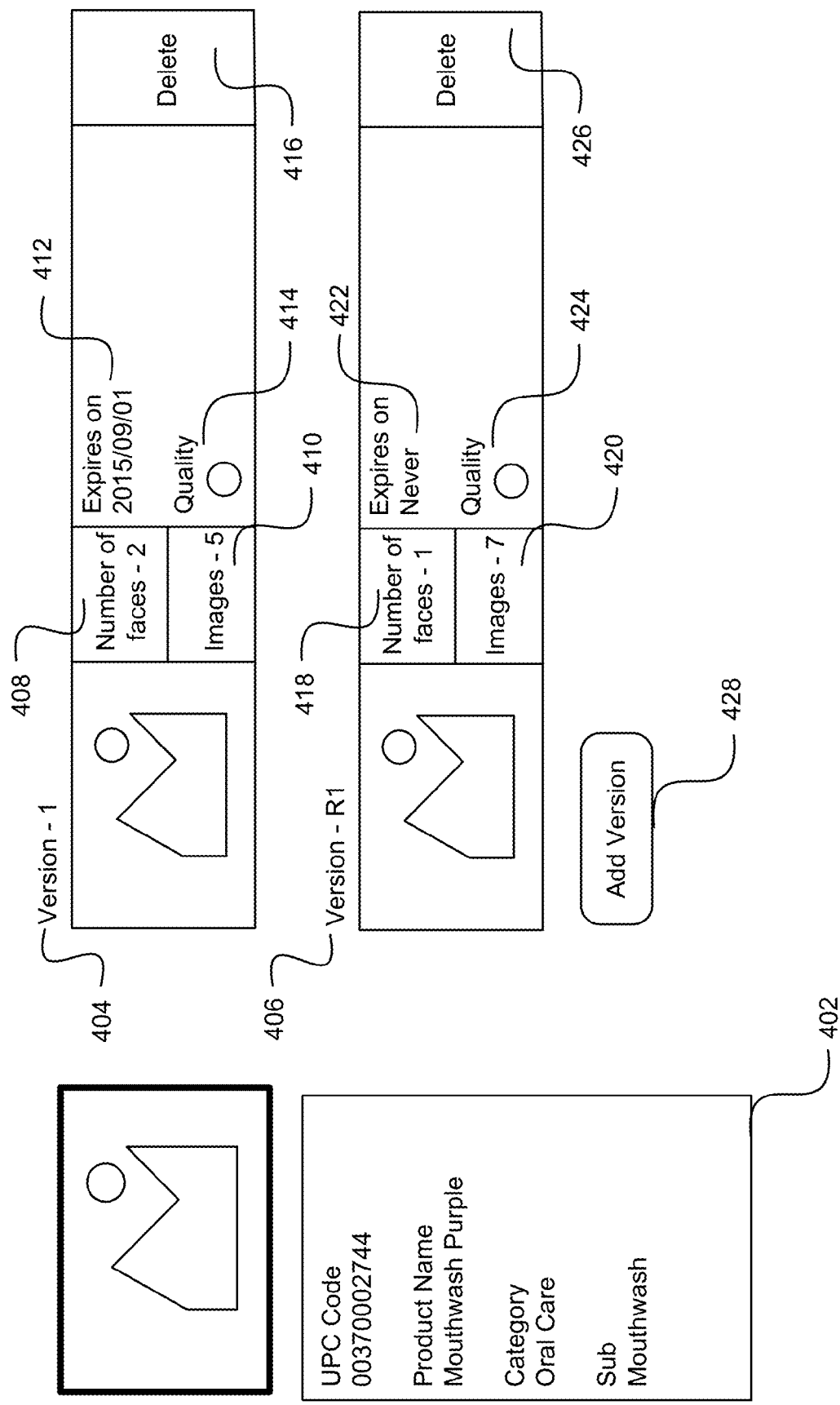
Figure 5:
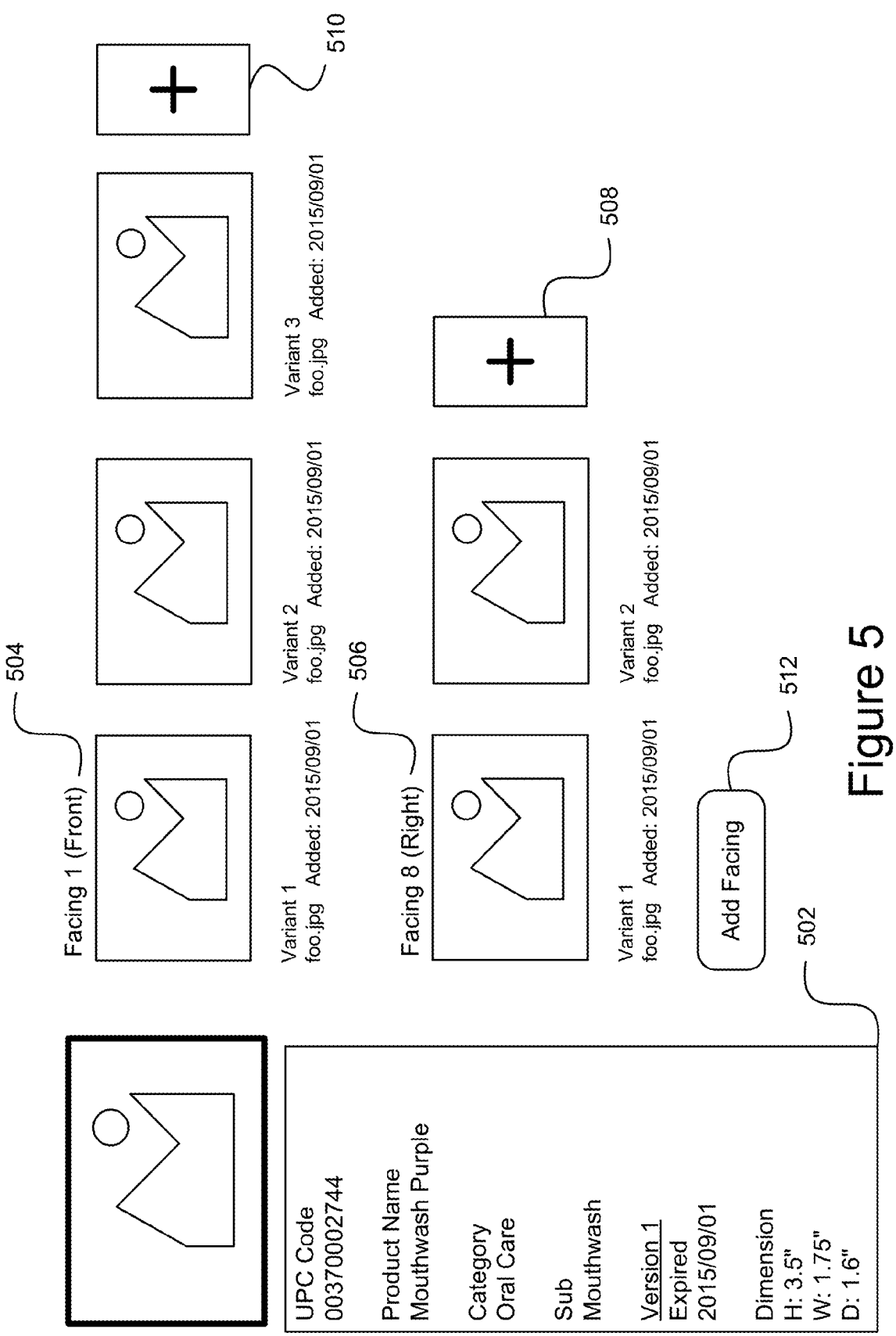

As shown in the example of FIGS. 3-5, the graphical representations illustrate one embodiment of a user interface for displaying a quality score for an index image. In FIG. 3, the user interface includes an option 302 to search a database of products indexed for identification. In response to receiving the search, the graphical user interface displays a list of products and details 304 associated with each product. The graphical user interface may include index images associated with the results of the product search and a quality associated with each image. The quality score indicator 306 indicates that the corresponding image has a high quality. The quality score indicator 308 indicates that the corresponding image has an acceptable quality. The quality score indicator 312 indicates that the corresponding image 314 has poor quality and should be replaced. The graphical user interface also includes options to add images 316 of a product and delete selected 318 images from the list.

In some embodiments, if a user selects a product from the list of products displayed in the example user interface of FIG. 3, a detailed view of the product information is displayed as depicted in the example of FIG. 4. The graphical user interface in FIG. 4 displays two versions 404 and 406 of a product and detailed product information 402. The first version 404 of the product has a total of 5 index images 410 describing 2 faces 408 of the product. The graphical user interface also includes an expiry date 412, a quality of images 414 for the first version 404, and an option to delete 416 the version. The second version 406 of the product has a total of 7 images 420 describing 1 face 418 of the product. The second version 406 is also associated with an expiry date 422, a quality of images 424 for the second version 406, and an option to delete 426 the version. In some embodiments, the quality of the images 414 and 424 may be an average or other statistical measure of the individual quality of images associated with a respective product. The graphical user interface may also include options to add other versions 428 of the product to the product information.

In some embodiments, if a user selects a version (e.g., version 404 in the example of FIG. 4) a graphical user interface showing detailed version information may be displayed as shown in the example of FIG. 5. In FIG. 5, the graphical user interface depicts a front facing 504 and a right facing 506 for a product. Each facing 504 and 506 may include index images of the product that can be used for product identification in query images. The graphical user interface may include an option 504 to add a variant of front facing 504 of the product and an option 508 to add a variant of right facing 506 of the product. In some embodiments, the graphical user interface also includes an option to add another facing 512 of the product.

Figure 6:
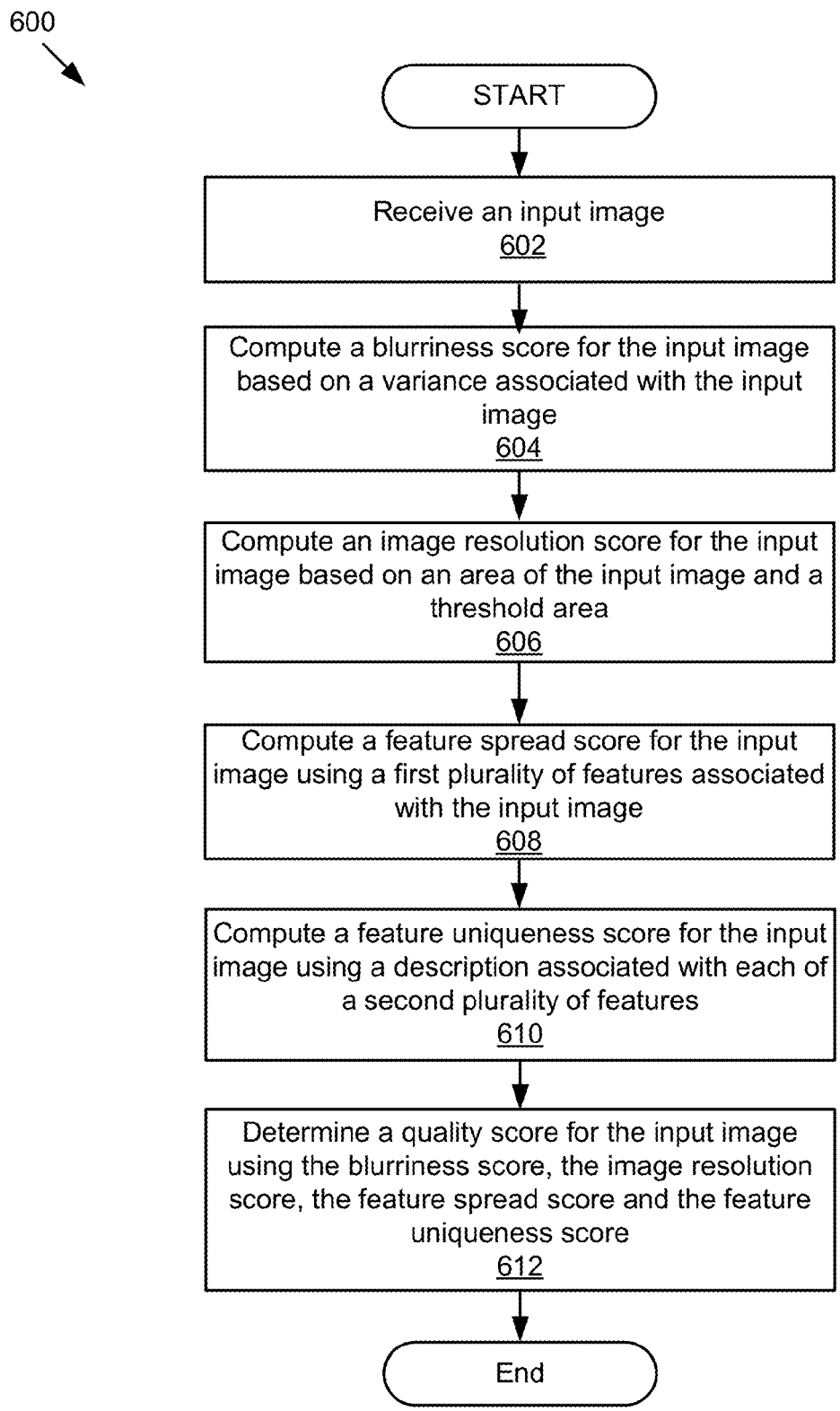
FIG. 6 is an example flow diagram illustrating one embodiment of a method for computing a quality score for an index image.

FIG. 6 is an example flow diagram illustrating one embodiment of a method 600 for computing a quality score for an input image. At 602, the image recognition application 103 receives an input image. For example, the image recognition application 103 may receive an image to include in an index for identifying objects in query images. The input image may be captured using a camera at a client device 115. At 604, the blur estimation engine 203 computes a blurriness score for the input image based on a variance associated with the input image. At 606, the image resolution engine 205 computes an image resolution score for the input image based on an area of the input image and a threshold area. At 608, the feature spread engine 207 computes a feature spread score for the input image using a first plurality of features associated with the input image. At 610, the feature uniqueness engine 209 computes a feature uniqueness score for the input image using a description associated with each of a second plurality of features. At 612, the quality score generation engine 211 determines a quality score for the input image using the blurriness score, the image resolution score, the feature spread score, and the feature uniqueness score.

Figure 7:
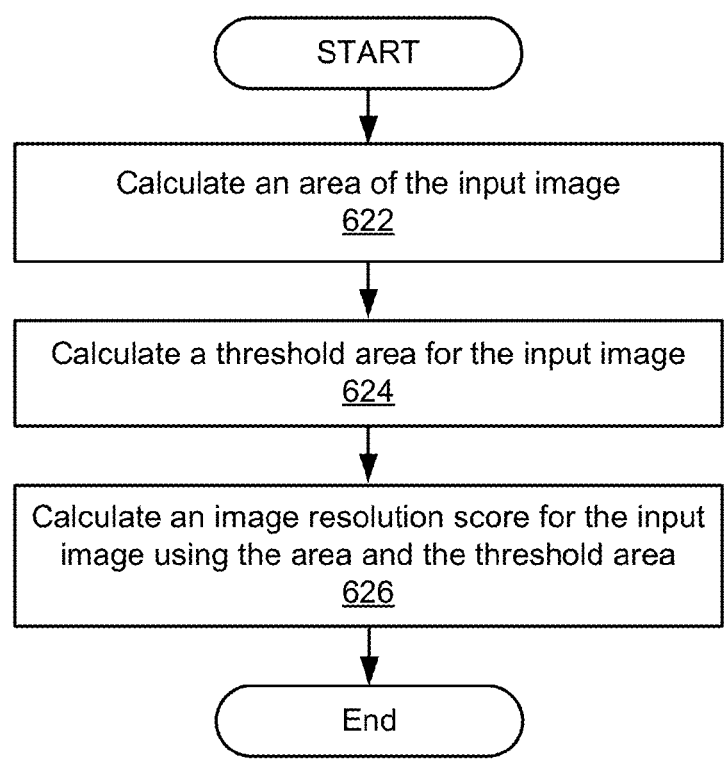
FIG. 7 is an example flow diagram illustrating one embodiment of a method for computing an image resolution score for an index image.

FIG. 7 is an example flow diagram illustrating one embodiment of a method 606 for computing an image resolution score for an input image. At 622, the image resolution engine 205 calculates an area of the input image. In some embodiments, the area of the input image is calculated as the product of the pixel width and the pixel height of the input image. At 624, the image resolution engine 205 calculates a threshold area for the input image. In some embodiments, the threshold area is pre-determined. At 626, the image resolution engine 205 calculates the image resolution score for the input image using the area of the input image and the threshold area as described herein.

Figure 8:
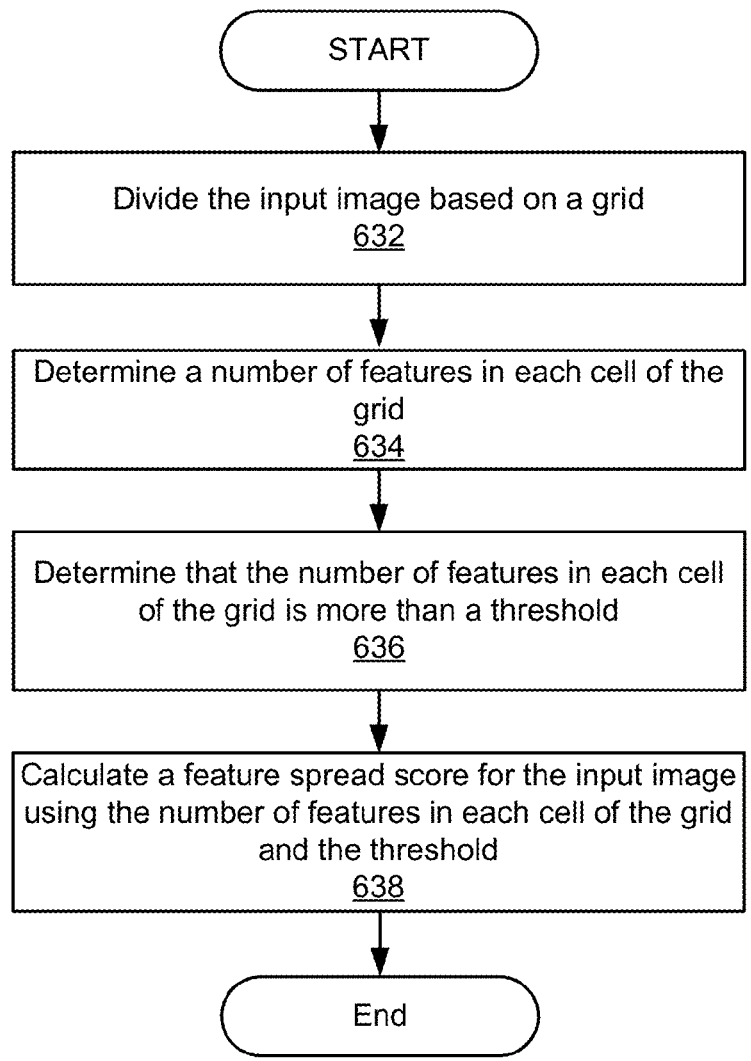
FIG. 8 is an example flow diagram illustrating one embodiment of a method for computing a feature spread score for an index image.

FIG. 8 is an example flow diagram illustrating one embodiment of a method 608 for computing a feature spread score for an input image. At 632, the feature spread engine 207 divides the input image based on a grid. At 634, the feature spread engine 207 determines a number of features in each cell of the grid. At 636, the feature spread engine 207 determines that the number of features in each cell of the grid is more than a threshold. At 638, the feature spread engine 207 calculates the feature spread score for the input image using the number of features in each cell of the grid and the threshold.

Figure 9:
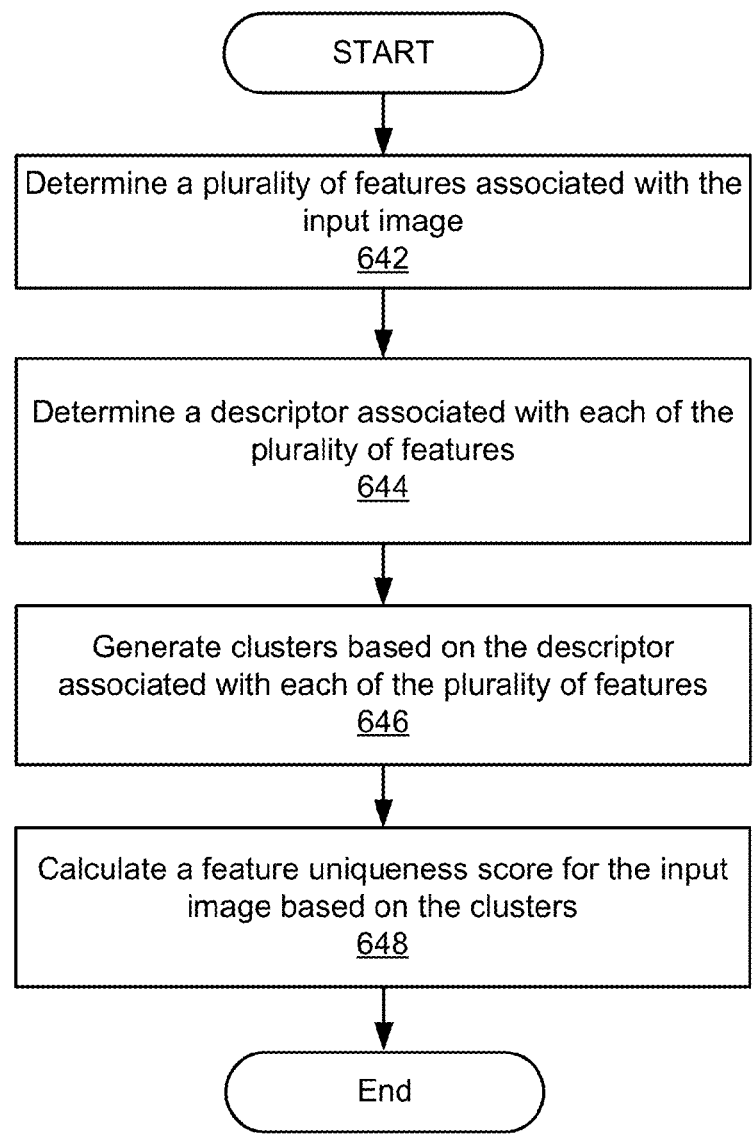
FIG. 9 is an example flow diagram illustrating one embodiment of a method for computing a feature uniqueness score for an index image.

FIG. 9 is an example flow diagram illustrating one embodiment of a method 610 for computing a feature uniqueness score for an input image. At 642, the feature uniqueness engine 209 determines a plurality of features associated with the input image. At 644, the feature uniqueness engine 209 determines a descriptor associated with each of the plurality of features. At 646, the feature uniqueness engine 209 generates clusters based on the descriptor associated with each of the plurality of features. In some embodiments, the features having similar descriptors are clustered together. At 648, the feature uniqueness engine 209 calculates a feature uniqueness score for the input image based on the clusters. In some embodiments, the feature uniqueness score is based on the total number of clusters.

A system and method for computing a quality score for an input image has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, by one or more processors, an input image;
   computing, by the one or more processors, a blurriness score for the input image based on a variance associated with the input image;
   computing, by the one or more processors, an image resolution score for the input image based on an area of the input image;
   computing, by the one or more processors, a feature spread score for the input image using a first plurality of features associated with the input image;
   computing, by the one or more processors, a feature uniqueness score for the input image using a description associated with each of a second plurality of features;
   determining, by the one or more processors, a quality score for the input image using the blurriness score, the image resolution score, the feature spread score, and the feature uniqueness score; and
   generating a graphical user interface for presentation to a user, wherein the graphical user interface includes the input image and an indication of the quality score.

2. The method of claim 1, wherein computing a blurriness score for the input image comprises:
   convolving the input image using a Laplacian kernel;
   calculating the variance associated with the input image using the convolved image; and
   calculating the blurriness score for the input image using the variance.

3. The method of claim 1, wherein computing an image resolution score for the input image comprises:
   calculating an area of the input image; and
   calculating the image resolution score for the input image using a ratio between the area and a threshold area.

4. The method of claim 1, wherein computing a feature spread score for the input image comprises:
   dividing the input image based on a grid;
   determining a number of features in each cell of the grid; and
   calculating the feature spread score for the input image using the number of features in each cell of the grid.

5. The method of claim 1, wherein computing a feature uniqueness score for the input image comprises:
   determining a descriptor associated with each of the second plurality of features;
   generating clusters based on the descriptor associated with each of the second plurality of features; and
   calculating the feature uniqueness score for the input image based on the clusters.

6. The method of claim 5, wherein each of the second plurality of features is associated with a locator and the descriptor, the locator describing a location of the feature in the input image and the descriptor including a number.

7. The method of claim 1,
   wherein the quality score indicates recognizability of the input image.

8. A system comprising:
   one or more processors; and
   a memory storing instructions comprising, which when executed by the one or more processors, cause the one or more processors to implement:
      an image recognition application to receive an input image;
      a blur estimation engine to compute a blurriness score for the input image based on a variance associated with the input image;
      an image resolution engine to compute an image resolution score for the input image based on an area of the input image;
      a feature spread engine to compute a feature spread score for the input image using a first plurality of features associated with the input image;
      a feature uniqueness engine to compute a feature uniqueness score for the input image using a description associated with each of a second plurality of features;
      a quality score generation engine to:
         determine a quality score for the input image using the blurriness score, the image resolution score, the feature spread score, and the feature uniqueness score; and
         generate a graphical user interface for presentation to a user, wherein the graphical user interface includes the input image and an indication of the quality score.

9. The system of claim 8, wherein the blur estimation engine is configured to:
   convolve the input image using a Laplacian kernel;
   calculate the variance associated with the input image using the convolved image; and
   calculate the blurriness score for the input image using the variance.

10. The system of claim 8, wherein the image resolution engine is configured to:
    calculate an area of the input image; and
    calculate the image resolution score for the input image using a ratio between the area and a threshold area.

11. The system of claim 8, wherein the feature spread engine is configured to:
    divide the input image based on a grid;
    determine a number of features in each cell of the grid; and
    calculate the feature spread score for the input image using the number of features in each cell of the grid.

12. The system of claim 8, wherein the feature uniqueness engine is configured to:

determine a descriptor associated with each of the second plurality of features;
generate clusters based on the descriptor associated with each of the second plurality of features; and
calculate the feature uniqueness score for the input image based on the clusters.

13. The system of claim 12, wherein each of the second plurality of features is associated with a locator and the descriptor, the locator describing a location of the feature in the input image and the descriptor including a number.

14. The system of claim 8,
wherein the quality score indicates recognizability of the input image.

15. A non-transitory computer-readable medium storing instructions which, when executed by one or more processors, causes the one or more processors to:
receive an input image;
compute a blurriness score for the input image based on a variance associated with the input image;
compute an image resolution score for the input image based on an area of the input image;
compute a feature spread score for the input image using a first plurality of features associated with the input image;
compute a feature uniqueness score for the input image using a description associated with each of a second plurality of features;
determine a quality score for the input image using the blurriness score, the image resolution score, the feature spread score, and the feature uniqueness score; and
generate a graphical user interface for presentation to a user, wherein the graphical user interface includes the input image and an indication of the quality score.

16. The non-transitory computer-readable medium of claim 15, wherein to compute a blurriness score for the input image the instructions cause the one or more processors to:
convolve the input image using a Laplacian kernel;
calculate the variance associated with the input image using the convolved image; and
calculate the blurriness score for the input image using the variance.

17. The non-transitory computer-readable medium of claim 15, wherein to compute an image resolution score for the input image the instructions cause the one or more processors to:
calculate an area of the input image; and
calculate the image resolution score for the input image using a ratio between the area and a threshold area.

18. The non-transitory computer-readable medium of claim 15, wherein to compute a feature spread score for the input image the instructions cause the one or more processors to:
divide the input image based on a grid;
determine a number of features in each cell of the grid; and
calculate the feature spread score for the input image using the number of features in each cell of the grid.

19. The non-transitory computer-readable medium of claim 15, wherein to compute a feature uniqueness score for the input image the instructions cause the one or more processors to:
determine a descriptor associated with each of the second plurality of features;
generate clusters based on the descriptor associated with each of the second plurality of features; and
calculate the feature uniqueness score for the input image based on the clusters.

20. The non-transitory computer-readable medium of claim 19, wherein each of the second plurality of features is associated with a locator and the descriptor, the locator describing a location of the feature in the input image and the descriptor including a number.

21. The non-transitory computer-readable medium of claim 15,
wherein the quality score indicates recognizability of the input image.

* * * * *